(12) United States Patent
Lv et al.

(10) Patent No.: US 12,264,861 B2
(45) Date of Patent: Apr. 1, 2025

(54) CONTROLLER, AIR CONDITIONER, AND HIGH-PRESSURE PROTECTION CIRCUIT

(71) Applicant: HANGZHOU LEADERWAY ELECTRONICS CO., LTD, Zhejiang (CN)

(72) Inventors: Yongsong Lv, Zhejiang (CN); Guojian Qiu, Zhejiang (CN); Lusi Zhang, Zhejiang (CN)

(73) Assignee: HANGZHOU LEADERWAY ELECTRONICS CO., LTD, Hangzhou (CN)

( * ) Notice: Subject to any disclaimer, the term of this patent is extended or adjusted under 35 U.S.C. 154(b) by 322 days.

(21) Appl. No.: 17/877,222

(22) Filed: Jul. 29, 2022

(65) Prior Publication Data

US 2022/0381497 A1 Dec. 1, 2022

Related U.S. Application Data

(63) Continuation of application No. PCT/CN2022/086148, filed on Apr. 11, 2022.

(30) Foreign Application Priority Data

Apr. 16, 2021 (CN) .......................... 202120778332.8
Apr. 16, 2021 (CN) .......................... 202120789232.5

(51) Int. Cl.
*F25B 49/02* (2006.01)
*H02M 1/42* (2007.01)
*H02M 3/335* (2006.01)

(52) U.S. Cl.
CPC ............. *F25B 49/022* (2013.01); *H02M 1/42* (2013.01); *H02M 3/33507* (2013.01); *F25B 2600/021* (2013.01); *F25B 2700/19* (2013.01)

(58) Field of Classification Search
CPC .............. F25B 49/022; F25B 2600/021; F25B 2700/19; H02M 1/42; H02M 3/33507
See application file for complete search history.

(56) References Cited

U.S. PATENT DOCUMENTS 4,932,220 A * 6/1990 Inoue ....................... F24F 11/88
62/226
2015/0285529 A1* 10/2015 Li ......................... F25B 49/005
62/126

(Continued)

FOREIGN PATENT DOCUMENTS

| CN | 104081657 A | 10/2014 |
|---|---|---|
| CN | 107084514 A | 8/2017 |

(Continued)

*Primary Examiner* — Henry T Crenshaw
(74) *Attorney, Agent, or Firm* — IPkey PLLC

(57) ABSTRACT

Provided is a controller, an air conditioner, and a high-pressure protection circuit. The controller includes a first rectifier unit, a power conversion unit, a high pressure switch (HPS) wiring terminal, a low-voltage control unit, and a high-voltage operating unit. An input end of the first rectifier unit is capable of being electrically connected to an input power supply. An output end of the first rectifier unit is electrically connected to an input end of the power conversion unit. An output end of the power conversion unit is electrically connected to a power supply end of the low-voltage control unit. The HPS wiring terminal is connected to the front end of the power supply end of the low-voltage control. The controller has a function of high-pressure protection.

20 Claims, 7 Drawing Sheets

(56) References Cited

U.S. PATENT DOCUMENTS

2018/0029479 A1\* 2/2018 Wang ................ B60L 53/00
2021/0057906 A1   2/2021 Kim et al.

FOREIGN PATENT DOCUMENTS

| CN | 109196769 A | 1/2019 |
| CN | 110594953 A | 12/2019 |
| CN | 214791794 U | 11/2021 |
| CN | 215601023 U | 1/2022 |

\* cited by examiner

CONTROLLER, AIR CONDITIONER, AND HIGH-PRESSURE PROTECTION CIRCUIT

CROSS REFERENCE TO RELATED APPLICATIONS

The present application is a continuation of International Application No. PCT/CN2022/086148, filed on Apr. 11, 2022, which claims priority to Chinese Patent Application No. CN202120789232.5, entitled "CONTROLLER, AIR CONDITIONER, AND HIGH-PRESSURE PROTECTION CIRCUIT" and filed with the Chinese Patent Office on Apr. 16, 2021, the entire contents of which are incorporated herein by reference in their entireties, and to Chinese Patent Application No. CN202120778332.8, entitled "CONTROLLER, AIR CONDITIONER, AND HIGH-PRESSURE PROTECTION CIRCUIT" and filed with the Chinese Patent Office on Apr. 16, 2021, the entire contents of which are incorporated herein by reference in their entireties.

TECHNICAL FIELD

The present disclosure relates to the field of circuit control, and in particular, to a controller, an air conditioner, and a high-pressure protection circuit associated with high-pressure protection.

BACKGROUND

During the operation of an air conditioner, excessive pressure of a compressor may cause damages to the air conditioner. And leakage of refrigerant in a refrigerant pipe may pollute the environment, or even cause safety accidents. Therefore, a refrigerant pipe of a refrigeration system of an air conditioner is generally provided with a high-pressure protection apparatus. The high-pressure protection apparatus typically includes a pressure switch arranged on the refrigerant pipe.

SUMMARY

In view of the above, according to some embodiments of the present disclosure, a controller, an air conditioner, and a high-pressure protection circuit are provided, which can implement high-pressure protection.

In order to achieve the above objective, according to some embodiments of the present disclosure, the following technical solutions are provided.

According to some embodiments of the present disclosure, a controller is provided for controlling an air conditioner, including a first rectifier unit, a power conversion unit, a high pressure switch (HPS) wiring terminal, a low-voltage control unit, and a high-voltage operating unit.

An input end of the first rectifier unit being electrically connected to an input power supply; an output end of the first rectifier unit being electrically connected to an input end of the power conversion unit, and the first rectifier unit converting an input AC into a high-voltage DC and outputting the high-voltage DC to the power conversion unit; an output end of the power conversion unit being electrically connected to a power supply end of the low-voltage control unit, and the power conversion unit converting the high-voltage DC into a low-voltage DC and outputting the low-voltage DC to the power supply end of the low-voltage control unit to supply power to the low-voltage control unit; the HPS wiring terminal being electrically connected to a pressure switch; the HPS wiring terminal being connected to a front end of the power supply end of the low-voltage control unit to be capable of switching off or switching on a power supply voltage of the low-voltage control unit; an output end of the low-voltage control unit being connected to a control end of the high-voltage operating unit, and the low-voltage control unit outputting a control signal to control operation of the high-voltage operating unit. The HPS wiring terminal of the controller is connected to the front end of the power supply end of the low-voltage control unit to be capable of switching off or switching on a power supply voltage of the low-voltage control unit. When the system is under an excessively high pressure, two ends of the HPS wiring terminal are disconnected, the low-voltage control unit loses an operating power supply, and the low-voltage control unit cannot continue to provide control signals for the high-voltage operating unit, so that the whole controller stops operating, thereby realizing high-pressure protection.

The air conditioner according to the embodiments of the present disclosure includes the controller, and is capable of realizing a high-pressure protection function.

According to some embodiments of the present disclosure, a high-pressure protection circuit is further provided. The pressure switch is connected to the front end of the power supply end of the low-voltage control unit to be capable of switching off or switching on a power supply voltage of the low-voltage control unit. When the system is under an excessively high pressure, the pressure switch is off, the low-voltage control unit loses an operating power supply, and the low-voltage control unit cannot continue to provide control signals for the high-voltage operating unit, so that the whole controller stops operating, thereby realizing high-pressure protection.

BRIEF DESCRIPTION OF DRAWINGS

In order to more clearly illustrate the technical solutions in embodiments of the present disclosure, the accompanying drawings used in the description of the embodiments will be briefly introduced below. It is apparent that the accompanying drawings in the following description are only some embodiments of the present disclosure, and other drawings can be obtained by those skilled in the art from the provided drawings without creative efforts.

DESCRIPTION OF EMBODIMENTS

The technical solutions in the embodiments of the present disclosure are clearly and completely described below. It is apparent that the embodiments described are only some rather than all of the embodiments of the present disclosure. All other embodiments obtained by those of ordinary skill in the art based on the embodiments in the present disclosure without creative efforts fall within the protection scope of the present disclosure.

In the present disclosure, the terms such as "comprise", "include" or any other variants thereof are intended to cover a non-exclusive inclusion, so that processes, methods, items or devices including a series of elements not only include the elements, but also include other elements not listed explicitly, or other elements inherent to these processes, methods, items or devices. In the absence of more limitations, an element defined by the statement "comprising a/an . . . " does not exclude the existence of other identical elements in the processes, methods, items or devices including the element.

Figure 1:
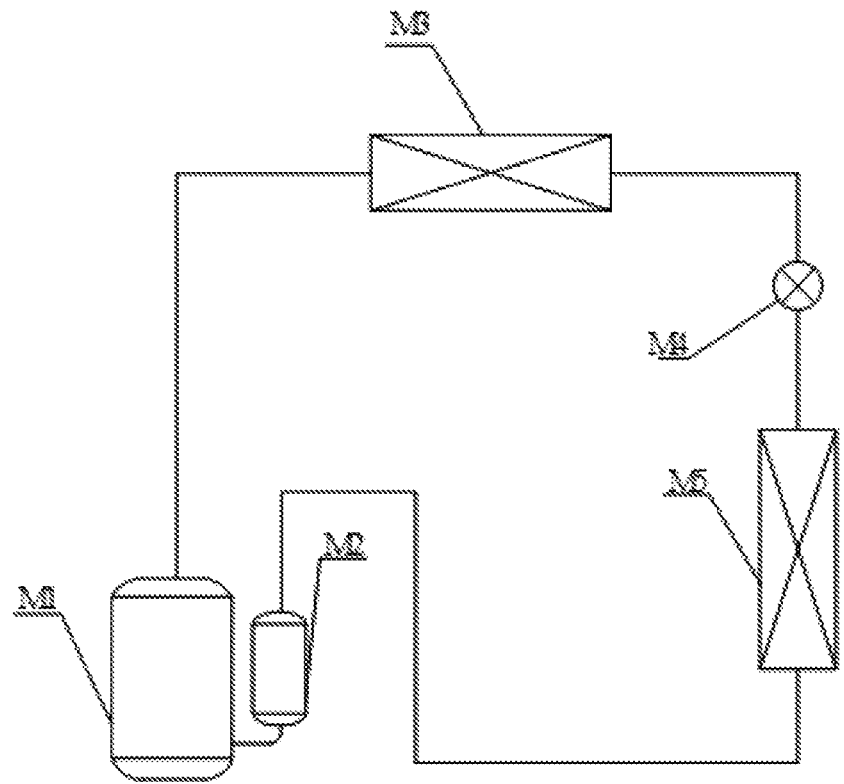
FIG. 1 is a schematic diagram of an air-conditioning system.

As shown in FIG. 1, a refrigeration device, such as an air-conditioning system, generally includes a compressor M1, a gas-liquid separator M2, a condenser M3, a throttling apparatus M4, and an evaporator M5. An outlet of the compressor M1 is connected to an inlet of the condenser M3 through a refrigerant pipe, an outlet of the condenser M3 is connected to an inlet of the throttling apparatus M4 through the refrigerant pipe, an outlet of the throttling apparatus M4 is connected to an inlet of the evaporator M5, an outlet of the evaporator M5 is connected to an inlet of the gas-liquid separator M2, and an outlet of the gas-liquid separator M2 is connected to an inlet of the compressor M1, so that a refrigeration loop is formed, in which refrigerant circulates. The gas-liquid separator M2 may be built in the compressor M1 or may be a liquid storage tank. If the compressor is under an excessively high pressure, the air conditioner may be damaged and the refrigerant in the refrigerant pipe may leak, thereby resulting in environmental pollution or even more serious safety accidents. Therefore, a pressure switch is generally arranged at the outlet of the compressor to monitor the pressure of the compressor. When the pressure is excessively high, the operation of the air conditioner is stopped, so as to prevent high-pressure hazards. Optionally, the pressure switch is arranged on a refrigerant pipe connecting the outlet of the compressor M1 and the inlet of the condenser M3.

In order to realize high-pressure protection, according to some embodiments of the present disclosure, a controller for controlling an air conditioner is provided, including a first rectifier unit, a power conversion unit, an HPS wiring terminal, a low-voltage control unit, and a high-voltage operating unit.

An input end of the first rectifier unit is capable of being electrically connected to an input power supply. An output end of the first rectifier unit is capable of being electrically connected to an input end of the power conversion unit, and the first rectifier unit converts an input AC into a high-voltage DC and outputs the high-voltage DC to the power conversion unit. An output end of the power conversion unit is electrically connected to a power supply end of the low-voltage control unit, and the power conversion unit converts the high-voltage DC into a low-voltage DC and outputs the low-voltage DC to the power supply end of the low-voltage control unit to supply power to the low-voltage control unit. The HPS wiring terminal is capable of being electrically connected to a pressure switch. The HPS wiring terminal is connected to a front end of the power supply end of the low-voltage control unit to be capable of switching off or switching on a power supply voltage of the low-voltage control unit. An output end of the low-voltage control unit is connected to a control end of the high-voltage operating unit, and the low-voltage control unit outputs a control signal to control operation of the high-voltage operating unit.

The embodiments of the present disclosure are divided into two aspects. A difference between the embodiments in the two aspects lies in different positions of the HPS wiring terminal. For example, in the embodiments in the first aspect, as shown in FIGS. 2-5, the HPS wiring terminal 10 may be arranged at an input end of a first rectifier unit 11. In the embodiments in the second aspect, as shown in FIG. 7 to FIG. 10, the HPS wiring terminal 10 may be arranged between an output end of a first rectifier unit and a power supply end of a low-voltage control unit.

Figure 2:
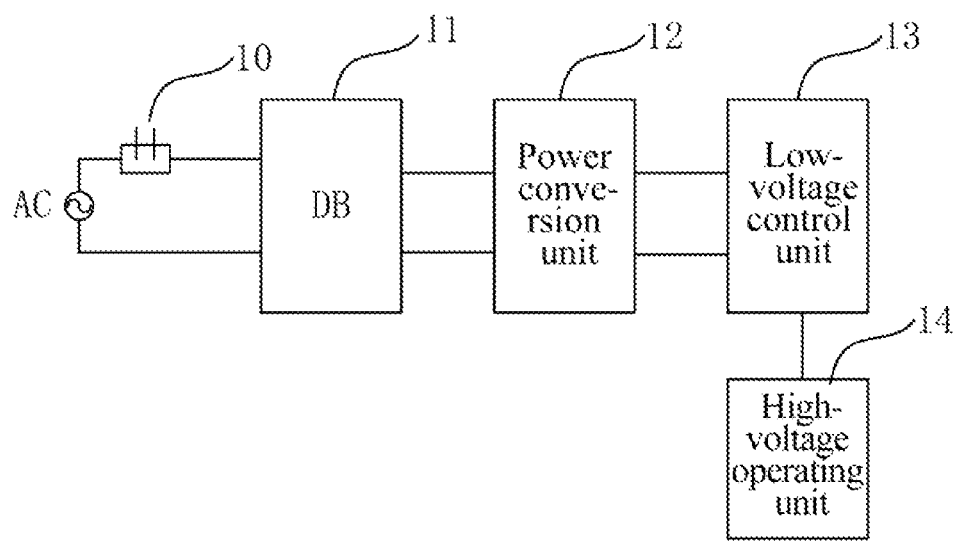
FIG. 2 is a schematic circuit diagram of a controller according to an embodiment in a first aspect of the present disclosure.

According to some embodiments in the first aspect of the present disclosure, a controller is provided, as shown in FIG. 2, including a first rectifier unit 11, a power conversion unit 12, an HPS wiring terminal 10, a low-voltage control unit 13, and a high-voltage operating unit 14.

A first end of an input side of the first rectifier unit 11 is electrically connected to a first end of the HPS wiring terminal 10, and a second end of the HPS wiring terminal 10 is capable of being electrically connected to a first end of the input power supply AC. The HPS wiring terminal 10 is capable of being electrically connected to the pressure switch. That is, the HPS wiring terminal 10 receives switch information of the pressure switch arranged in the air-conditioning system, and is switched on or off as the pressure switch is switched on or off. A second end of the input side of the first rectifier unit 11 is capable of being electrically connected to a second end of the input power supply AC. The first rectifier unit 11 has an output end electrically connected to the input end of the power conversion unit 12, and converts an AC into a high-voltage DC and outputs the high-voltage DC to the power conversion unit 12. The power conversion unit 12 has an output end electrically connected to the power supply end of the low-voltage control unit 13, and converts the high-voltage DC into a low-voltage DC and outputs the low-voltage DC to the power supply end of the low-voltage control unit 13 to supply power to the low-voltage control unit 13. The output end of the low-voltage control unit 13 is connected to the control end of the high-voltage operating unit 14 to control operation of the high-voltage operating unit 14. In an embodiment, a power supply of the high-voltage operating unit 14 is supplied by the input power supply AC, which may be directly supplied by the input power supply through the rectified high-voltage DC. A power supply voltage of the high-voltage operating unit 14 is higher than that of the low-voltage control unit 13. The power supply voltage of the high-voltage operating unit is generally greater than 100 V. The high-voltage operating unit 14 is at least configured to control the compressor, with an output end connected to the input of the compressor of the air conditioner. The high-voltage operating unit 14 is powered by a high-voltage DC and controlled by a control signal outputted by the low-voltage control unit 13. The high-voltage operating unit 14 cannot operate without the high-voltage DC supply power or the control signal outputted by the low-voltage control unit 13. Further, the compressor stops running, and the air conditioner no longer operates.

In this embodiment, the HPS wiring terminal 10 is connected in series between the input power supply AC and the first rectifier unit 11, and a switch signal of the pressure switch is transmitted to the controller through the HPS wiring terminal 10. When the air-conditioning system is under an excessively high pressure, the pressure switch is off, and two ends of the HPS wiring terminal 10 are open. In this case, a power supply loop of the input power AC is off, the first rectifier unit 11, the power conversion unit 12, and the low-voltage control unit 13 stop operating after losing power. The low-voltage control unit 13 can no longer provide control signals for the high-voltage operating unit 14 to control operation of the high-voltage operating unit 14, the high-voltage operating unit 14 stops operating, and the compressor driven and controlled by the high-voltage operating unit 14 stops operating. Therefore, the whole air-conditioning system also stops operating so as to realize the high-pressure protection for the air-conditioning system. When the pressure recovers or the air conditioner operates normally, the pressure switch is closed, two ends of the HPS wiring terminal 10 are short-circuited. In this case, the power supply loop of the input power AC is closed, the first rectifier unit 11, the power conversion unit 12, and the low-voltage control unit 13 are powered to operate, the low-voltage control unit 13 provides a control signal for the high-voltage operating unit 14, and the high-voltage operating unit 14 operates normally and drives the compressor to run. As a result, the whole air-conditioning system operates normally so as to realize the control over the air-conditioning system.

In some cases, in order to realize high-pressure protection, a pressure switch is used to generate a switch signal, and the switch signal is outputted to a controllable switch, such as a relay. When the system is under an excessively high pressure, the pressure switch generates an OFF switch signal. The controllable switch then controls the low-voltage control unit to stop outputting control signals based on the OFF switch signal generated by the pressure switch, so as to prevent the low-voltage control unit from outputting control signals to the high-voltage operating unit. Compared with the high-pressure protection manner, the controller according to the embodiments of the present disclosure can introduce the switch signal generated by the pressure switch into a power supply side of the low-voltage control unit directly through the HPS wiring terminal, and can use the switch signal to control whether the input power supply is switched on or off, so as to control the low-voltage control unit to be powered on or to be powered off, further to control whether the low-voltage control unit outputs control signals to the high-voltage operating unit, and finally to control whether the system runs normally. In an embodiment, when the system is under an excessively high pressure, two ends of the HPS wiring terminal are disconnected, the low-voltage control unit loses power supply and stops outputting control signals to the high-voltage operating unit, and the system stops running. When the system is under a normal pressure, the two ends of the HPS wiring terminal are connected, the low-voltage control unit is powered to operate and outputs a control signal to the high-voltage operating unit, and the system runs normally.

Figure 3:
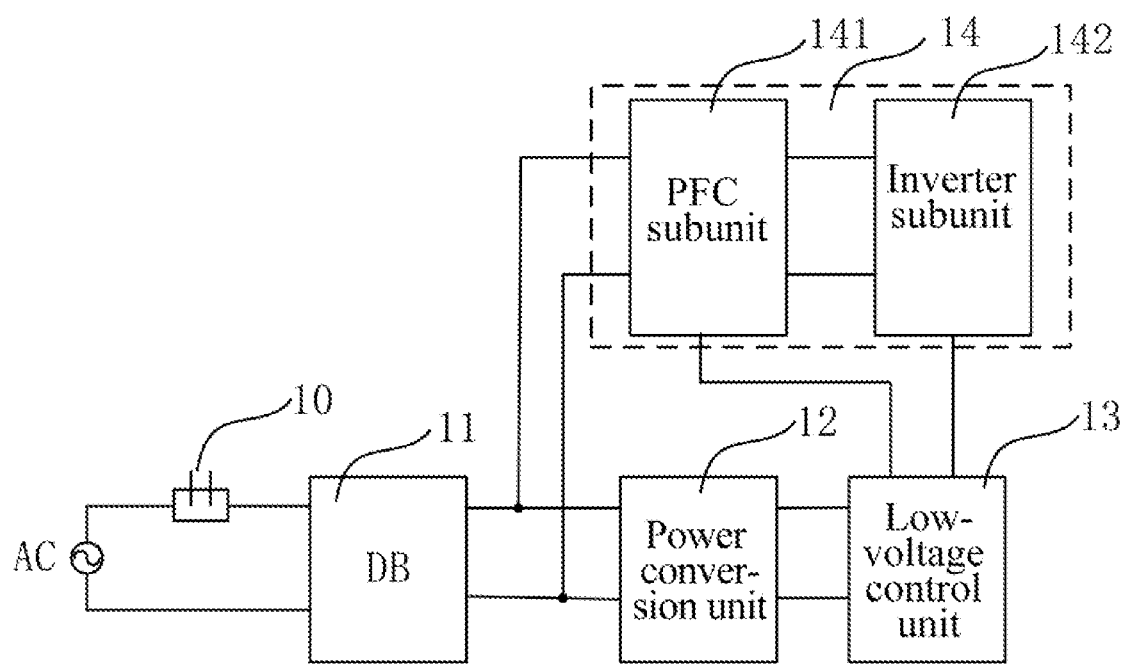
FIG. 3 is a schematic diagram of a circuit principle of a controller according to an embodiment in the first aspect of the present disclosure.

In one embodiment, as shown in FIG. 3, the high-voltage operating unit 14 includes a Power Factor Correction (PFC) subunit 141 and an inverter subunit 142. An input end of the PFC subunit 141 is electrically connected to the output end of the first rectifier unit 11, and an output end of the PFC subunit 141 is electrically connected to an input end of the inverter subunit 142. In this embodiment, power supplies of the high-voltage operating unit 14 and the low-voltage control unit 13 are both supplied by a high-voltage DC outputted by the first rectifier unit. When the system is under an excessively high pressure, the HPS wiring terminal 10 is disconnected, and both the high-voltage operating unit 14 and the low-voltage control unit 13 lose power supply voltages and stop operating, thereby preventing high-pressure dangers.

Figure 5:
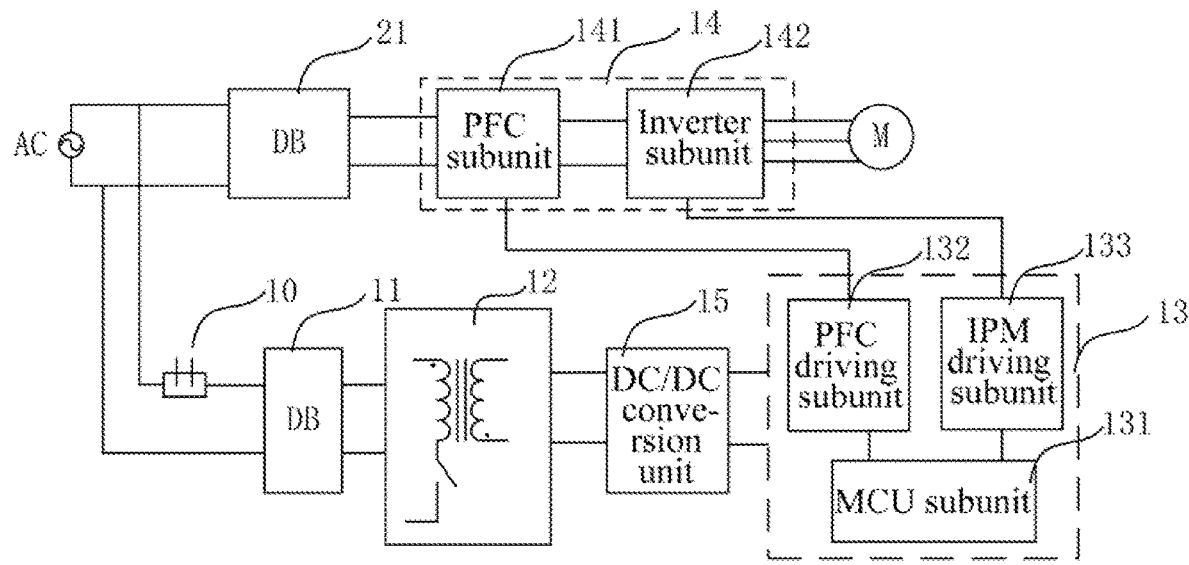
FIG. 5 is a schematic diagram of a circuit principle of a controller according to another embodiment in the first aspect of the present disclosure.

Further, in order to realize the control over the PFC subunit and the inverter subunit, as shown in FIG. 5, the low-voltage control unit 13 includes a Microcontroller Unit (MCU) subunit 131, an Intelligent Power Module (IPM) driving subunit 133, and a PFC driving subunit 132. A first signal output end of the MCU subunit 131 is electrically connected to the PFC driving subunit 132, and sends a first control signal to the PFC driving subunit 132. The PFC driving subunit 132 is electrically connected to a control end of the PFC subunit 141, and controls operation of the PFC subunit 141 based on the first control signal. The MCU subunit 131 has a second signal output end electrically connected to the IPM driving subunit 133, and sends a second control signal to the IPM driving subunit 133. The IPM driving subunit 133 is electrically connected to a control end of the inverter subunit 142, and controls operation of the inverter subunit 142 based on the second control signal. In an embodiment, control programs of PFC and IPM may be stored in the MCU subunit 131, which is not limited in the present disclosure. In this embodiment, when the system is under an excessively high pressure, the HPS wiring terminal is disconnected, the MCU subunit 131, the IPM driving subunit 133, and the PFC driving subunit 132 lose power supplies and then cannot provide control signals for the PFC subunit 141 and the inverter subunit 142, the PFC subunit 141 and the inverter subunit 142 stop operating, and the system stops running until the pressure recovers or the system restarts.

Figure 4:
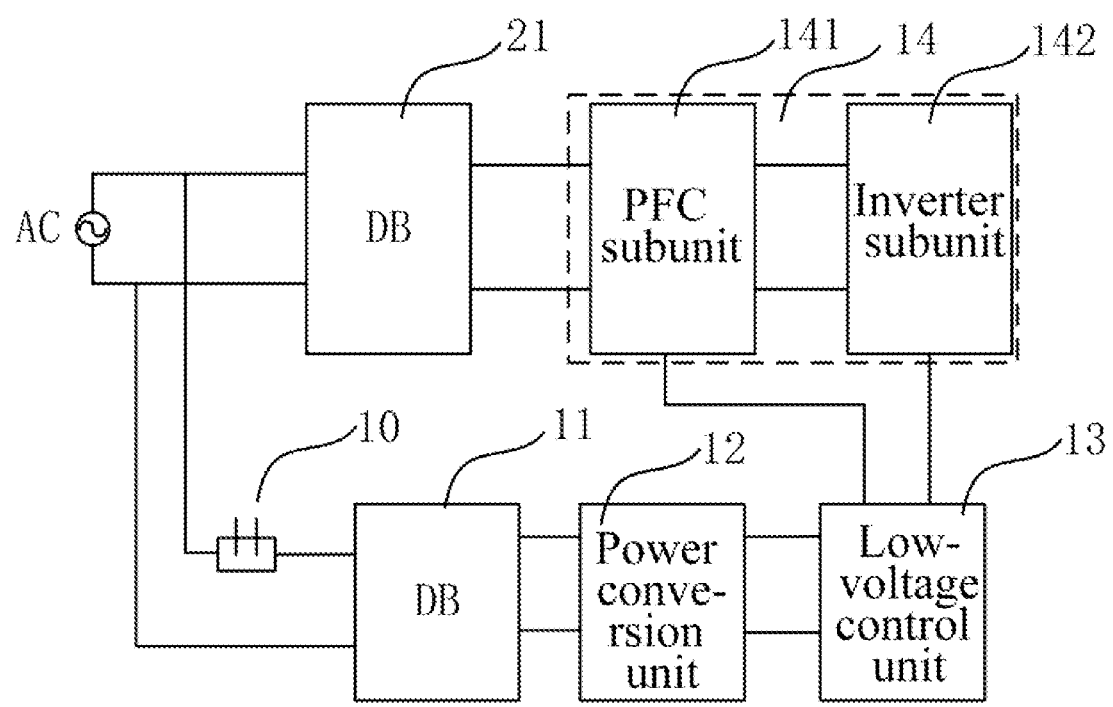
FIG. 4 is a schematic diagram of a circuit principle of a controller according to another embodiment in the first aspect of the present disclosure.

Further, in one embodiment, the high-voltage operating unit and the low-voltage control unit are powered from different rectifier units. In this embodiment, as shown in FIG. 4 or FIG. 5, the controller further includes a second rectifier unit 21. The low-voltage control unit 13 includes an MCU subunit 131 and/or an IPM driving subunit 133 and/or a PFC driving subunit 132. The high-voltage operating unit 14 includes a PFC subunit 141 and an inverter subunit 142. An input end of the PFC subunit 141 is electrically connected to an output end of the second rectifier unit 21, and an output end of the PFC subunit 141 is electrically connected to an input end of the inverter subunit 142. In this embodiment, the power supply voltage of the low-voltage control unit is supplied by the first rectifier unit 11, while the power supply voltage of the high-voltage operating unit is supplied by the second rectifier unit 21. When the system is under an excessively high pressure, the HPS wiring terminal 10 connected between the input power supply AC and the first rectifier unit 11 is disconnected. The low-voltage control unit loses power and stops providing control signals for the high-voltage operating unit, and the high-voltage operating unit stops operating. However, the power supply voltage of the high-voltage operating unit is supplied by the second rectifier unit 21, and the power supply loop is still on, thus the high-voltage operating unit only loses the control signal, but does not lose the power supply. When the pressure of the system recovers normally, it is beneficial for the system to operate normally in time.

In the above embodiments, the power supply voltage of the low-voltage control unit generally includes one or more of 3.3 V, 5 V, 12 V, 15 V, and 24 V. In order to convert a high-voltage DC outputted by the first rectifier unit 11 into a low-voltage DC, the power conversion unit may include a flyback conversion unit, as shown in FIG. 5. Further, the controller may be further provided within a DC/DC conversion unit 15. An output end of the flyback conversion unit is electrically connected to an input end of the DC/DC conversion unit 15, and an output end of the DC/DC conversion unit 15 is electrically connected to the power supply end of the low-voltage control unit 13. Through the DC/DC conversion unit 15, an output voltage of the flyback conversion circuit can be stabilized or adjusted to a suitable low voltage as required, so as to supply power to the MCU subunit 131 and/or the IPM driving subunit 133 and/or the PFC driving subunit 132.

Further, in the above embodiments, the PFC subunit 141 may be arranged as a boost circuit.

Based on the controller with the high-pressure protection function in the first aspect, according to some embodiments of the present disclosure, an air conditioner is further provided, as shown in FIG. 1, including a compressor, a condenser, a throttling apparatus, an evaporator, and the controller (not shown). The high-voltage operating unit 14 of the controller is electrically connected to the compressor to control the compressor. The pressure switch of the system is arranged on a refrigerant pipe connecting the compressor M1 and the condenser M3, or arranged at an outlet of the compressor M1. When the system is under a normal condition, the pressure switch is closed. When the system is under an excessively high pressure, the pressure switch is off, which is transmitted to the controller through the HPS wiring terminal of the controller. The controller loses a power supply or is out of control due to the disconnection of two ends of the HPS wiring terminal, so that the system stops running, thereby realizing high-pressure protection. When the pressure recovers, the pressure switch is closed, which is transmitted to the controller through the HPS wiring terminal of the controller. The controller obtains a power supply and a control signal to operate normally because two ends of the HPS wiring terminal are on, and the system runs normally.

Based on the controller in the first aspect, according to some embodiments of the present disclosure, a high-pressure protection circuit is further provided, applied to a refrigeration system, such as an air conditioner. The refrigeration system is provided with a pressure switch, which may be arranged on a refrigerant pipe between the compressor M1 and the condenser M3, or arranged at an outlet of the compressor M1. The HPS is closed when the system is under a normal pressure, and is open when the system is under an excessively high pressure.

Figure 6:
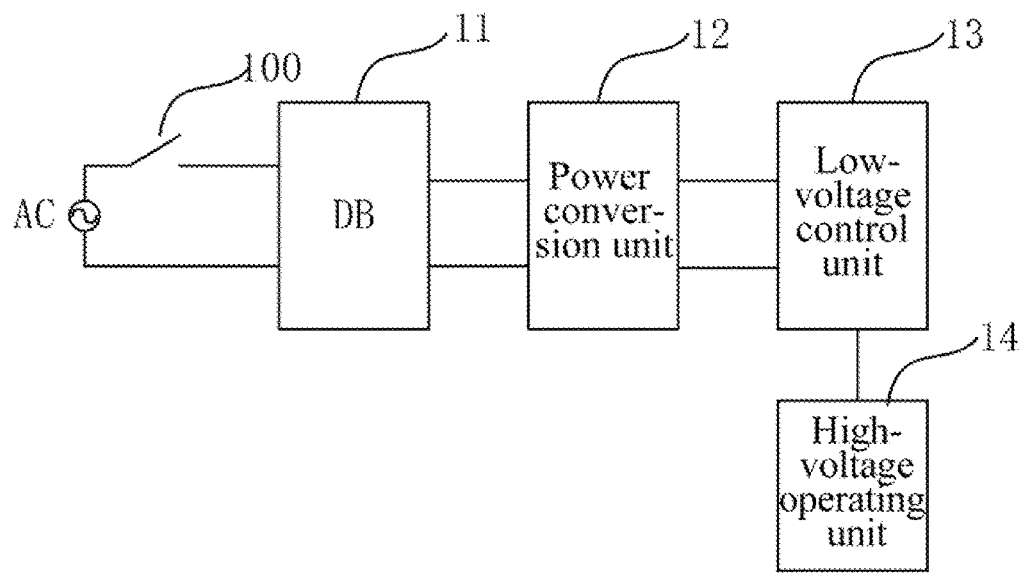
FIG. 6 is a schematic diagram of a high-pressure protection circuit of the controller according to the first aspect of the present disclosure.

As shown in FIG. 6, the high-pressure protection circuit includes a first rectifier unit 11, a power conversion unit 12, a pressure switch 100, a low-voltage control unit 13, and a high-voltage operating unit 14.

A first end of an input side of the first rectifier unit 11 is electrically connected to a first end of the pressure switch 100, and a second end of the pressure switch 100 is capable of being electrically connected to a first end of the input power supply AC. A second end of the input side of the first rectifier unit 11 is capable of being electrically connected to a second end of the input power supply AC. The first rectifier unit 11 has an output end electrically connected to the input end of the power conversion unit 12, and converts an AC into a high-voltage DC and outputs the high-voltage DC to the power conversion unit 12. The output end of the power conversion unit 12 is electrically connected to the power supply end of the low-voltage control unit 13. The high-voltage DC is converted into a low-voltage DC and outputted to the power supply end of the low-voltage control unit 13 to supply power to the low-voltage control unit 13. The output end of the low-voltage control unit 13 is connected to a control end of the high-voltage operating unit 14 to control operation of the high-voltage operating unit 14. A power supply voltage of the high-voltage operating unit 14 is supplied by the input power supply. In this embodiment, when the system is under an excessively high pressure, the pressure switch is off, the low-voltage control unit 13 loses power and stops providing control signals for the high-voltage operating unit, and the system stops running.

In an embodiment, the low-voltage control unit 13 includes an MCU subunit 131 and/or an IPM driving subunit 133 and/or a PFC driving subunit 132, and the high-voltage operating unit 14 includes a PFC subunit 141 and an inverter subunit 142. The inverter subunit 142 is connected to the compressor of the refrigeration system to control operation of the compressor. An input end of the PFC subunit 141 is electrically connected to the output end of the first rectifier unit 11, and an output end of the PFC subunit 141 is electrically connected to an input end of the inverter subunit 142. The MCU subunit 131 has a first signal output end electrically connected to the PFC driving subunit 132, and sends a first control signal to the PFC driving subunit 132. The PFC driving subunit 132 is electrically connected to a control end of the PFC subunit 141, and controls operation of the PFC subunit 141 based on the first control signal. The MCU subunit 131 has a second signal output end electrically connected to the IPM driving subunit 133, and sends a second control signal to the IPM driving subunit 133. The IPM driving subunit 133 is electrically connected to a control end of the inverter subunit 142, and controls operation of the inverter subunit 142 based on the second control signal.

Further, in an embodiment, a second rectifier unit 21 is further included. The low-voltage control unit 13 includes an MCU subunit 131 and/or an IPM driving subunit 133 and/or a PFC driving subunit 132, and the high-voltage operating unit 14 includes a PFC subunit 141 and an inverter subunit 142. An input end of the PFC subunit 141 is electrically connected to an output end of the second rectifier unit 21, and an output end of the PFC subunit 141 electrically connected to an input end of the inverter subunit 142;

The first signal output end of the MCU subunit 131 is electrically connected to the PFC driving subunit 132, and sends a first control signal to the PFC driving subunit 132; the PFC driving subunit 132 is electrically connected to a control end of the PFC subunit 141, and controls operation of the PFC subunit 141 based on the first control signal; and/or the MCU subunit 131 has a second signal output end electrically connected to the IPM driving subunit 133, and sends a second control signal to the IPM driving subunit 133; the IPM driving subunit 133 is electrically connected to a control end of the inverter subunit 142, and controls operation of the inverter subunit 142 based on the second control signal.

The high-pressure protection circuit according to the embodiments of the present disclosure has the advantages of the controller, and can realize high-pressure protection for the system.

Figure 7:
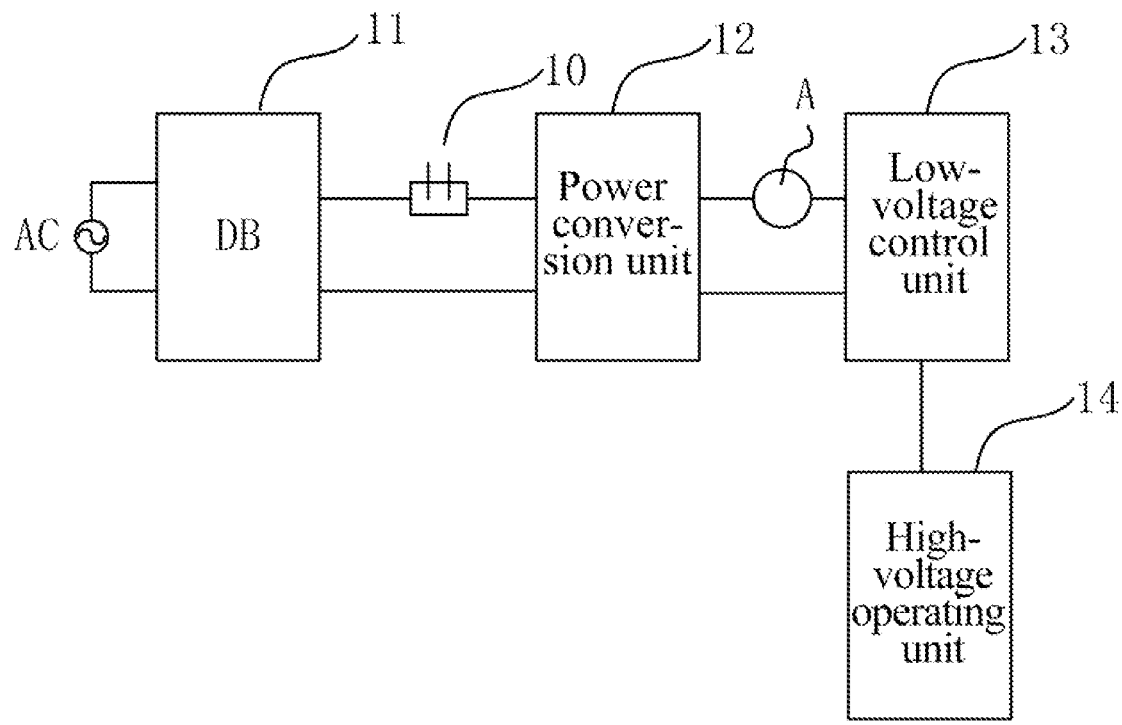
FIG. 7 is a schematic diagram of a circuit principle of a controller according to an embodiment in a second aspect of the present disclosure.

In order to realize high-pressure protection, according to some embodiments in the second aspect of the present disclosure, a controller for controlling an air conditioner is provided. As shown in FIG. 7, the controller includes a first rectifier unit 11, a power conversion unit 12, an HPS wiring terminal 10, a low-voltage control unit 13, and a high-voltage operating unit 14. In the embodiments according to the second aspect and the embodiments according to the first aspect, the HPS wiring terminal 10 and the HPS 100 are placed at different positions of the circuit and are identical in other circuit principles. The following is only a detailed description for differences, and other principles can be referred to each other.

An input end of the first rectifier unit 11 is capable of being electrically connected to an input power supply AC. The first rectifier unit 11 has an output end electrically connected to an input end of the power conversion unit 12, and converts an input AC into a high-voltage DC and outputs the high-voltage DC to the power conversion unit 12. The power conversion unit 12 has an output end electrically connected to a power supply end of the low-voltage control unit 13, and converts the high-voltage DC into a low-voltage DC and outputs the low-voltage DC to the power supply end of the low-voltage control unit to supply power to the low-voltage control unit 13. The HPS wiring terminal 10 is capable of being electrically connected to a pressure switch. That is, HPS wiring terminal 10 receives switch information of the pressure switch arranged in the air-conditioning system, and is switched on or off as the pressure switch is switched on or off. The HPS wiring terminal 10 is connected to a front end of the power supply end of the low-voltage control unit 113 to be capable of switching off or switching on a power supply voltage of the low-voltage control unit 13. As shown in FIG. 7, in an embodiment, the HPS wiring terminal 10 may be connected between the output end of the first rectifier unit 11 and the input end of the power conversion unit 12. In another embodiment, the HPS wiring terminal 10 is be capable of being connected between the output end of the power conversion unit 12 and the power supply end of the low-voltage control unit 13, as shown at Point A in FIG. 7. An output end of the low-voltage control unit 13 is connected to a control end of the high-voltage operating unit 14 to control operation of the high-voltage operating unit 14. The power supply voltage of the high-voltage operating unit 14 is supplied by the input power supply AC, which may be directly supplied by the input power supply through the rectified high-voltage DC. A power supply voltage of the high-voltage operating unit 14 is higher than that of the low-voltage control unit 13, which is generally greater than 100 V.

In this embodiment, the power supply voltage of the high-voltage operating unit 14 is supplied by the input power supply AC. The high-voltage operating unit 14 is at least configured to control the compressor, with an output end connected to the input end of the compressor of the air conditioner. The high-voltage operating unit 14 is powered by a high-voltage DC and controlled by a control signal outputted by the low-voltage control unit 13. The high-voltage operating unit 14 cannot operate without the high-voltage DC supplying power or the control signal outputted by the low-voltage control unit 13. Further, the compressor stops running, and the air conditioner no longer operates.

In this embodiment, if the HPS wiring terminal 10 is connected between the first rectifier unit 11 and the power conversion unit 12, a switch signal of the pressure switch is connected to the controller through the HPS wiring terminal 10. When the air-conditioning system is under an excessively high pressure, the pressure switch is off, and two ends of the HPS wiring terminal 10 are open. In this case, the output end of the first rectifier unit 11 is disconnected from the input end of the power conversion unit 12, the high-voltage DC passing through the first rectifier unit 11 cannot be transferred to the power conversion unit 12. Thereby the low-voltage control unit 13 loses power and stops operating. The low-voltage control unit 13 can no longer provide control signals for the high-voltage operating unit 14 to enable the high-voltage operating unit 14 to operate. The high-voltage operating unit 14 stops operating, and the compressor driven and controlled by the high-voltage operating unit 14 stops operating. Therefore, the whole air-conditioning system also stops operating so as to realize the high-pressure protection for the air-conditioning system. When the pressure recovers or the air conditioner operates normally and the pressure switch is closed, two ends of the HPS wiring terminal 10 are short-circuited. In this case, the output end of the first rectifier unit 11 and the input end of the power conversion unit 12 form a path, the power conversion unit 12 and the low-voltage control unit 13 are powered to operate. The low-voltage control unit 13 provides a control signal for the high-voltage operating unit 14 which operates normally and drives the compressor to run. Thereby the whole air-conditioning system also operates normally so as to realize the control over the air-conditioning system. Similarly, if the HPS wiring terminal 10 is connected between the output end of the power conversion unit 12 and the power supply end of the low-voltage control unit 13, namely at Point A in FIG. 2, when the air-conditioning system is under an excessively high pressure, the output end of the power conversion unit 12 is disconnected from the power supply end of the low-voltage control unit 13, the low-voltage DC outputted by the power conversion unit 12 cannot be transferred to the low-voltage control unit 13, the low-voltage control unit 13 loses power and stops operating, the low-voltage control unit 13 can no longer provide control signals for the high-voltage operating unit 14 to control operation of the high-voltage operating unit 14, the high-voltage operating unit 14 stops operating, and the compressor driven and controlled by the high-voltage operating unit 14 stops operating. Therefore, the whole air-conditioning system also stops operating so as to realize the high-pressure protection for the air-conditioning system.

The controller according to the embodiments of the present disclosure introduces the switch signal generated by the pressure switch into a power supply side of the low-voltage control unit directly through the HPS wiring terminal. The switch signal can be used to control whether the power supply voltage of the low-voltage control unit is switched on or off, so as to further control whether the low-voltage control unit outputs control signals to the high-voltage operating unit, and finally to control whether the system runs normally. In an embodiment, when the system is under an excessively high pressure, two ends of the HPS wiring terminal are disconnected, the low-voltage control unit loses power supply and stops outputting control signals to the high-voltage operating unit, and the system stops running. When the system is under a normal pressure, the two ends of the HPS wiring terminal are connected, the low-voltage control unit is powered to operate and outputs a control signal to the high-voltage operating unit, and the system runs normally.

As shown in FIG. 7, in an embodiment, the HPS wiring terminal 10 is connected between the output end of the first rectifier unit 11 and the input end of the power conversion unit 12, a specific connection relationship is as follows. A first end of the HPS wiring terminal 10 is electrically connected to a first output end of the first rectifier unit 11, a second end of the HPS wiring terminal 10 is electrically connected to a first input end of the power conversion unit 12, and a second output end of the first rectifier unit 11 is connected to a second input end of the power conversion unit 12. The terms "first" and "second" are merely used for descriptive purposes but not to be construed as indicating or implying relative importance, and therefore cannot be construed as limiting the present disclosure.

Figure 8:
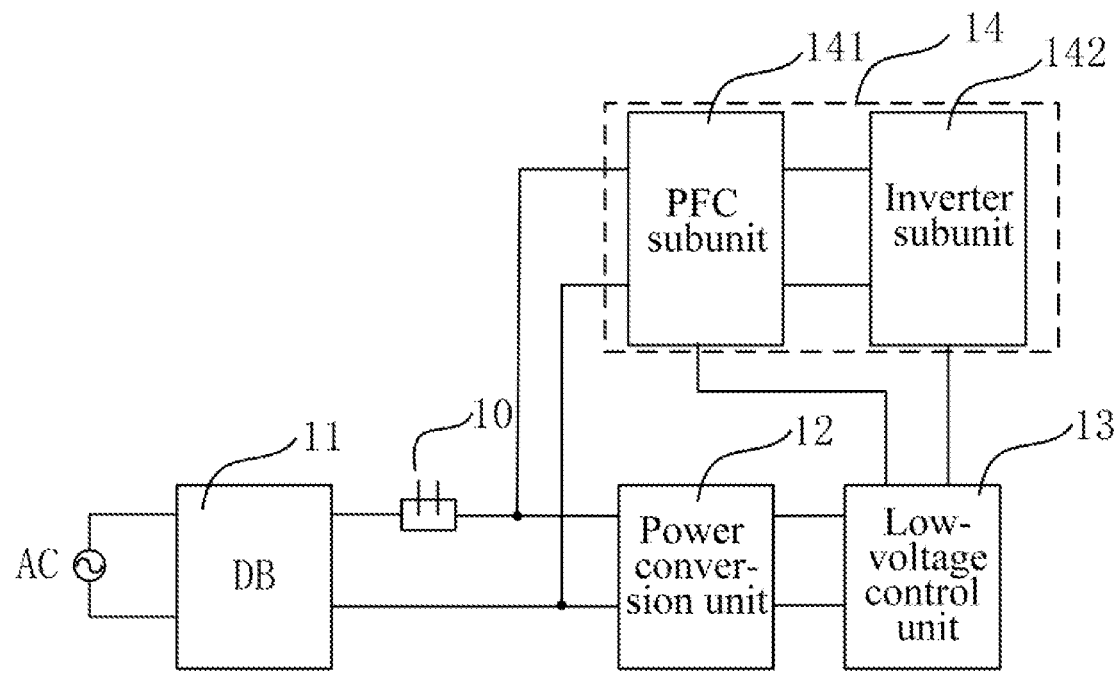
FIG. 8 is a schematic diagram of a circuit principle of a controller according to another embodiment in the second aspect of the present disclosure.

In an embodiment, as shown in FIG. 8, the high-voltage operating unit includes a PFC subunit 141 and an inverter subunit 142. The low-voltage control unit includes an MCU subunit 131, an IPM driving subunit 133, and a PFC driving subunit 132. A first input end of the PFC subunit 141 is electrically connected to the second end of the HPS wiring terminal 10, a second input end of the PFC subunit 141 is electrically connected to the second output end of the first rectifier unit 11, and an output end of the PFC subunit 141 is electrically connected to an input end of the inverter unit 142.

In this embodiment, power supplies of the high-voltage operating unit 14 and the low-voltage control unit 13 are both supplied by a high-voltage DC outputted by the first rectifier unit. When the system is under an excessively high pressure, the HPS wiring terminal 10 is off, paths through which the first rectifier unit 11 supplies a high-voltage DC to the PFC subunit 141 and the power conversion unit 12 are cut off, and both the high-voltage operating unit 14 and the low-voltage control unit 13 lose power supply voltages and stop operating, thereby preventing high-pressure dangers.

Figure 9:
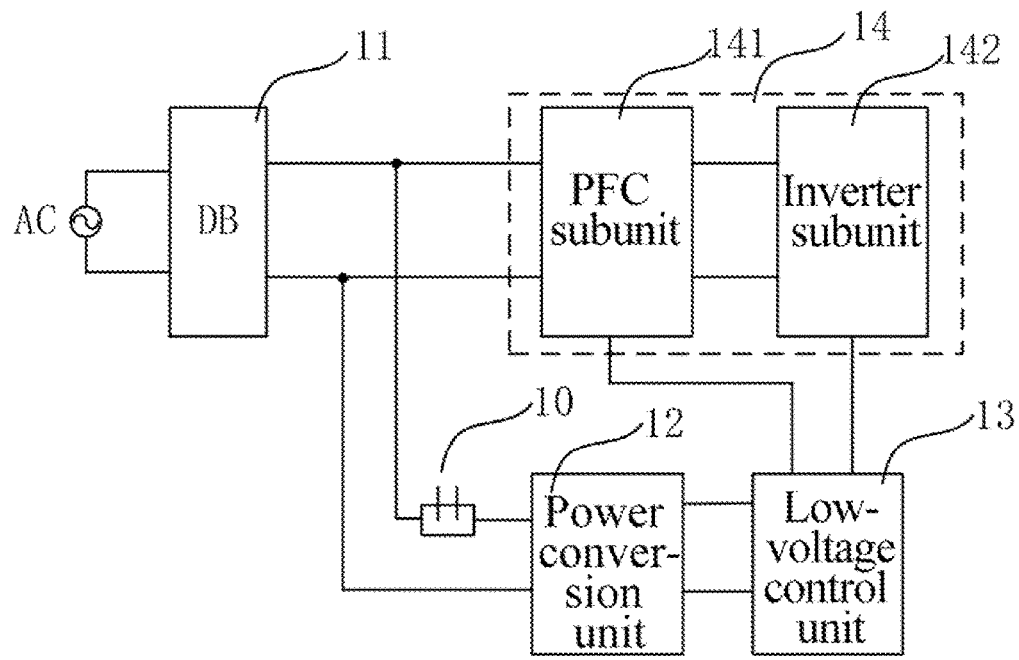
FIG. 9 is a schematic diagram of a circuit principle of a controller according to another embodiment in the second aspect of the present disclosure.

In another embodiment, as shown in FIG. 9, the high-voltage operating unit includes a PFC subunit 141 and an inverter subunit 142. The low-voltage control unit includes an MCU subunit 131, an IPM driving subunit 133, and a PFC driving subunit 132. A first input end of the PFC subunit 141 is electrically connected to a first output terminal of the first rectifier unit 11, and a second input end of the PFC subunit 141 is electrically connected to a second output end of the first rectifier unit 11. An output end of the PFC subunit 141 is electrically connected to an input end of the inverter unit 142.

In this embodiment, power supplies of the high-voltage operating unit 14 and the low-voltage control unit 13 are both supplied by a high-voltage DC outputted by the first rectifier unit. When the system is under an excessively high pressure, the HPS wiring terminal is off, the MCU subunit 131, the IPM driving subunit 133, and the PFC driving subunit 132 lose power supplies, and then cannot provide control signals for the PFC subunit 141 and the inverter subunit 142. The PFC subunit 141 and the inverter subunit 142 stop operating, and the system stops running until the pressure recovers or the system restarts. However, when the system is under an excessively high pressure, the path between the output end of the first rectifier unit 11 and the input end of the PFC subunit 141 is not cut off. That is, the PFC subunit 141 and the inverter subunit 142 do not lose power supply voltages but just lose control signals. When the pressure of the system recovers, it is beneficial for the system to operate normally in time.

Figure 10:
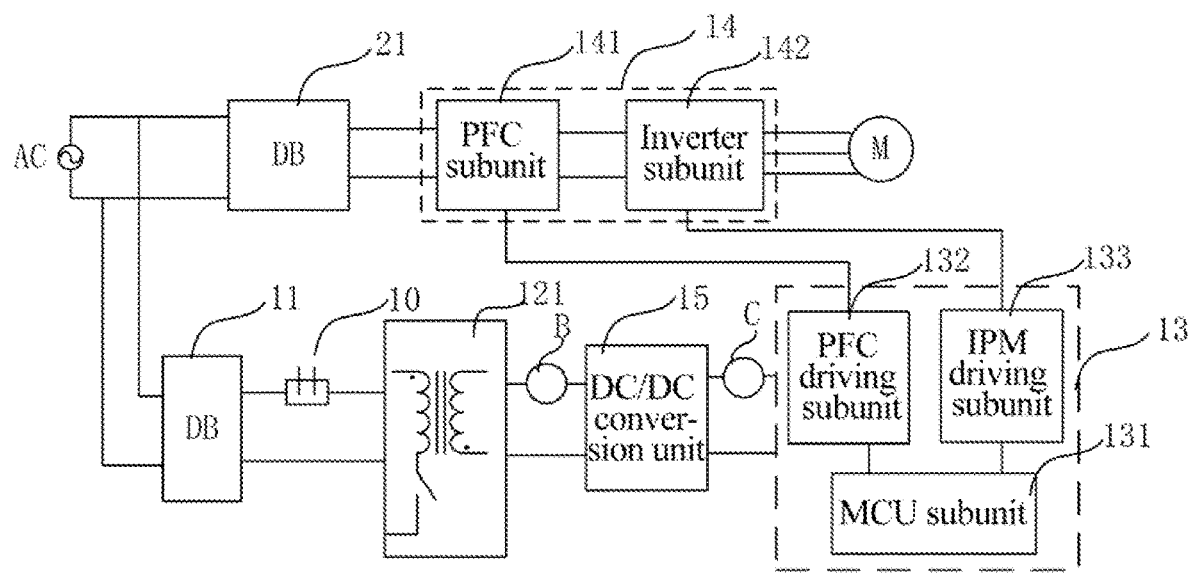
FIG. 10 is a schematic diagram of a circuit principle of a controller according to another embodiment in the second aspect.

In the above embodiments, the MCU subunit 131, the IPM driving subunit 133, and the PFC driving subunit 132 are connected in the manner as shown in FIG. 10. That is, the first signal output end of the MCU subunit 131 is electrically connected to the PFC driving subunit 132, and sends a first control signal to the PFC driving subunit 132; the PFC driving subunit 132 is electrically connected to a control end of the PFC subunit 141, and controls operation of the PFC subunit 141 based on the first control signal; the MCU subunit 131 has a second signal output end electrically connected to the IPM driving subunit 133, and sends a second control signal to the IPM driving subunit 133; the IPM driving subunit 133 is electrically connected to a control end of the inverter subunit 142, and controls operation of the inverter subunit 142 based on the second control signal.

In another embodiment, as shown in FIG. 10, a second rectifier unit is provided. The high-voltage operating unit and the low-voltage control unit are powered from different rectifier units. The high-voltage DC of the high-voltage operating unit is outputted by the second rectifier unit 21, and the high-voltage DC of the power conversion unit is outputted by the first rectifier unit 11. In an embodiment, the low-voltage control unit 13 includes an MCU subunit 131, an IPM driving subunit 133, and a PFC driving subunit 132, and the high-voltage operating unit includes a PFC subunit 141 and an inverter subunit 142. An input end of the PFC subunit 141 is electrically connected to an output end of the second rectifier unit 21, and an output end of the PFC subunit 141 is electrically connected to an input end of the inverter subunit 142.

In this embodiment, the voltage of the low-voltage control unit is supplied by the first rectifier unit 11, while the voltage of the high-voltage operating unit is supplied by the second rectifier unit 21. When the system is under an excessively high pressure, the HPS wiring terminal is open, the low-voltage control unit loses power and stops providing control signals for the high-voltage operating unit, and the high-voltage operating unit stops operating. However, the power supply voltage of the high-voltage operating unit is supplied by the second rectifier unit 21, and the power supply loop is still on. Therefore, the high-voltage operating unit only loses the control signal and does not lose the power supply. When the pressure of the system recovers, it is beneficial for the system to operate normally in time.

In the above embodiments, the power supply voltage of the low-voltage control unit generally includes one or more of 3.3 V, 5 V, 12 V, 15 V, and 24 V. In order to convert a high-voltage DC outputted by the first rectifier unit 11 into a low-voltage DC, the power conversion unit may include a flyback conversion unit 121, as shown in FIG. 10. Further, the controller may be further provided with a DC/DC conversion unit 15. An output end of the flyback conversion unit is electrically connected to an input end of the DC/DC conversion unit 15, and an output end of the DC/DC conversion unit 15 is electrically connected to the power supply end of the low-voltage control unit 13. Through the DC/DC conversion unit 15, an output voltage of the flyback conversion circuit can be stabilized or adjusted to a suitable low voltage as required to supply power to the MCU subunit 131 and/or the IPM driving subunit 133 and/or the PFC driving subunit 132. In this embodiment, as shown in FIG. 10, the HPS wiring terminal 10 may be connected between the output end of the first rectifier unit 11 and an input end of the flyback conversion unit 121, or the HPS wiring terminal 10 may be connected between the output end of the flyback conversion unit 121 and the input end of the DC/DC conversion unit 15 (as shown at Point B in FIG. 10), or the HPS wiring terminal 10 may be connected between the output end of the DC/DC conversion unit 15 and the power supply end of the low-voltage control unit (as shown at Point C in FIG. 10). The HPS wiring terminal 10 is arranged at any one of the 3 circuit positions. When the system is under an excessively high pressure, two ends of the HPS wiring terminal 10 are disconnected, the MCU subunit 131 and/or the IPM driving subunit 133 and/or the PFC driving subunit 132 lose power supply voltages and cannot provide control signals for the PFC subunit and the inverter subunit, and the controller stops running until the pressure of the system recovers or the system restarts.

Based on the controller with a high-pressure protection function in the second aspect, according to some embodiments of the present disclosure, an air conditioner is further provided, as shown in FIG. 1, including a compressor, a condenser, a throttling apparatus, an evaporator, and the controller (not shown). The high-voltage operating unit 14 of the controller is electrically connected to the compressor to control the compressor. The pressure switch of the system is arranged on a refrigerant pipe between the compressor M1 and the condenser M3, or arranged at an outlet of the compressor M1. Normally, the pressure switch is closed. When the system is under a high pressure, the pressure switch is off, which is transmitted to the controller through the HPS wiring terminal of the controller. The controller loses a power supply or control due to the disconnection of two ends of the HPS wiring terminal, so that the system stops running, thereby realizing high-pressure protection. When the pressure recovers, the pressure switch is closed, which is transmitted to the controller through the HPS wiring terminal of the controller. The controller obtains a power supply and a control signal to operate normally because two ends of the HPS wiring terminal are on, and the system runs normally.

Based on the controller in the second aspect, according to some embodiments of the present disclosure, a high-pressure protection circuit is further provided, applied to a refrigeration system, such as an air conditioner. The refrigeration system is provided with a pressure switch, which may be arranged on a refrigerant pipe between the compressor M1 and the condenser M3, or arranged at an outlet end of the compressor M1. The HPS is closed when the system is under a normal pressure, and is open when the system is under an excessively high pressure.

Figure 11:
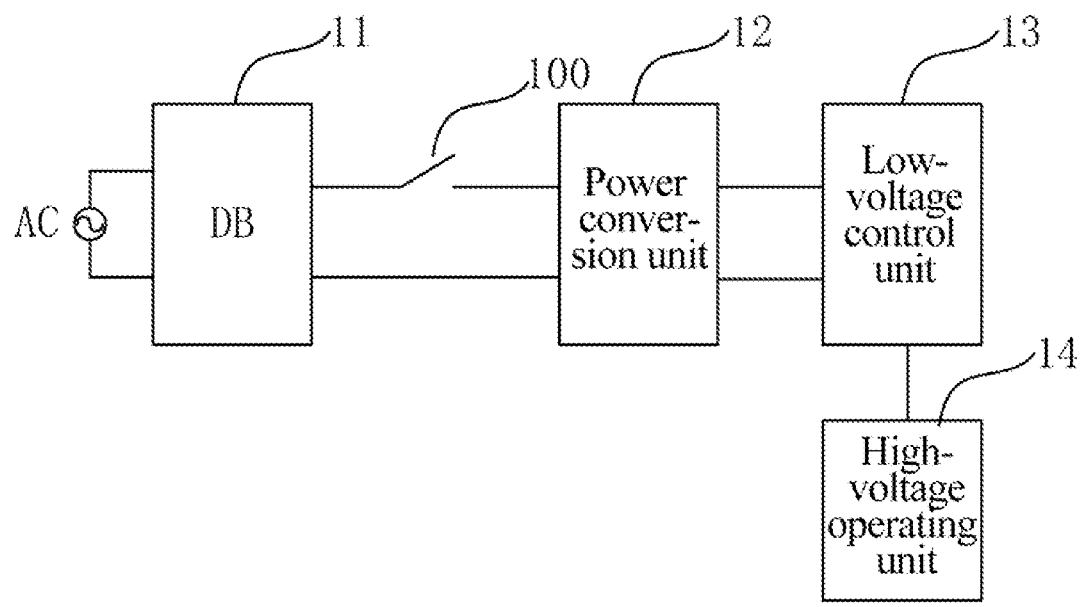
FIG. 11 is a schematic diagram of a high-pressure protection circuit of the controller according to the second aspect of the present disclosure.

As shown in FIG. 11, the high-pressure protection circuit includes a first rectifier unit 11, a power conversion unit 12, a pressure switch 100, a low-voltage control unit 13, and a high-voltage operating unit 14.

An input end of the first rectifier unit 11 is capable of being electrically connected to an input power supply AC. The first rectifier unit 11 has an output end electrically connected to an input end of the power conversion unit 12, and converts an input AC into a high-voltage DC and outputs the high-voltage DC to the power conversion unit 12. The power conversion unit 12 has an output end electrically connected to the power supply end of the low-voltage control unit 13, and converts the high-voltage DC into a low-voltage DC and outputs the low-voltage DC to the power supply end of the low-voltage control unit 13 to supply power to the low-voltage control unit 13. The pressure switch 100 is connected to a front end of the power supply end of the low-voltage control unit 13 to be capable of switching off or switching on a power supply voltage of the low-voltage control unit 13. For example, the pressure switch is connected between the output end of the first rectifier unit 11 and the input end of the power conversion unit 12, or the pressure switch is connected between the output end of the power conversion unit and the power supply end of the low-voltage control unit. The output end of the low-voltage control unit 13 is connected to the control end of the high-voltage operating unit 14 to control operation of the high-voltage operating unit 14. A power supply voltage of the high-voltage operating unit 14 is supplied by the input power supply.

Further, in an embodiment, the power conversion unit includes a flyback conversion unit. The high-pressure protection circuit further includes a DC/DC conversion unit, an output end of the flyback conversion unit is electrically connected to an input end of the DC/DC conversion unit, and an output end of the DC/DC conversion unit is electrically connected to the power supply end of the low-voltage control unit. The HPS wiring terminal is connected between the output end of the first rectifier unit and an input end of the flyback conversion unit, or the HPS wiring terminal is connected between the output end of the flyback conversion unit and the input end of the DC/DC conversion unit, or the HPS wiring terminal is connected between the output end of the DC/DC conversion unit and the power supply input end of the low-voltage control unit.

The high-pressure protection circuit according to the embodiments of the present disclosure has the advantages of the controller and can realize high-pressure protection for the system.

The above are only specific embodiments of the present disclosure, but are not intended to limit the protection scope of the present disclosure. Any variation or replacement readily figured out by those skilled in the art within the technical scope disclosed in the present disclosure shall fall within the protection scope of the present disclosure. Therefore, the protection scope of the present disclosure shall be subject to the protection scope of the claims.

What is claimed is:
1. A controller for controlling an air conditioner, comprising a first rectifier unit, a power conversion unit, a high pressure switch (HPS) wiring terminal, a low-voltage control unit, and a high-voltage operating unit;
wherein an input end of the first rectifier unit is capable of being electrically connected to an input power supply, an output end of the first rectifier unit is capable of being electrically connected to an input end of the power conversion unit, and the first rectifier unit is configured to convert an input alternating current (AC) into a high-voltage direct current (DC) and output the high-voltage DC to the power conversion unit;
wherein an output end of the power conversion unit is capable of being electrically connected to a power supply end of the low-voltage control unit, and the power conversion unit is configured to convert the high-voltage DC into a low-voltage DC and output the low-voltage DC to the power supply end of the low-voltage control unit to supply power to the low-voltage control unit;
wherein the HPS wiring terminal is capable of being electrically connected to a pressure switch, the HPS wiring terminal is connected to a front end of the power supply end of the low-voltage control unit so as to be capable of switching off or switching on a power supply voltage of the low-voltage control unit; and
wherein an output end of the low-voltage control unit is connected to a control end of the high-voltage operating unit, and the low-voltage control unit is configured to output a control signal to control operation of the high-voltage operating unit.

2. The controller according to claim 1, wherein a first end of an input side of the first rectifier unit is electrically connected to a first end of the HPS wiring terminal, and a second end of the HPS wiring terminal is capable of being electrically connected to a first end of the input power supply;

wherein a second end of the input side of the first rectifier unit is electrically connected to a second end of the input power supply;

wherein the HPS wiring terminal is capable of being electrically connected to the pressure switch;

wherein the output end of the first rectifier unit is electrically connected to the input end of the power conversion unit, and the first rectifier unit is configured to convert an AC into a high-voltage DC and output the high-voltage DC to the power conversion unit;

wherein the output end of the power conversion unit is electrically connected to the power supply end of the low-voltage control unit, and the power conversion unit is configured to convert the high-voltage DC into a low-voltage DC and output the low-voltage DC to the power supply end of the low-voltage control unit to supply power to the low-voltage control unit; and wherein the output end of the low-voltage control unit is connected to the control end of the high-voltage operating unit, and the low-voltage control unit is configured to output a control signal to control operation of the high-voltage operating unit.

3. The controller according to claim 2, wherein the low-voltage control unit comprises a microcontroller unit (MCU) subunit and an intelligent power module (IPM) driving subunit and a power factor correction (PFC) driving subunit, and the high-voltage operating unit comprises a PFC subunit and an inverter subunit; an input end of the PFC subunit is electrically connected to the output end of the first rectifier unit, and an output end of the PFC subunit is electrically connected to an input end of the inverter subunit;

wherein a first signal output end of the MCU subunit is electrically connected to the PFC driving subunit, and the MCU subunit is configured to send a first control signal to the PFC driving subunit; the PFC driving subunit is electrically connected to a control end of the PFC subunit, and the PFC driving subunit is configured to control operation of the PFC subunit based on the first control signal; and wherein a second signal output end of the MCU subunit is electrically connected to the IPM driving subunit, and the MCU subunit is configured to send a second control signal to the IPM driving subunit; the IPM driving subunit is electrically connected to a control end of the inverter subunit, and the IPM driving subunit is configured to control operation of the inverter subunit based on the second control signal.

4. The controller according to claim 1, wherein the HPS wiring terminal is connected between the output end of the first rectifier unit and the input end of the power conversion unit, a first end of the HPS wiring terminal is electrically connected to a first output end of the first rectifier unit, a second end of the HPS wiring terminal is electrically connected to a first input end of the power conversion unit, and a second output end of the first rectifier unit is electrically connected to a second input end of the power conversion unit.

5. The controller according to claim 4, wherein the low-voltage control unit comprises an MCU subunit and an IPM driving subunit and a PFC driving subunit, and the high-voltage operating unit comprises a PFC subunit and an inverter subunit; a first input end of the PFC subunit is electrically connected to the second end of the HPS wiring terminal, a second input end of the PFC subunit is electrically connected to a second output end of the first rectifier unit, and an output end of the PFC subunit is electrically connected to an input end of the inverter subunit;

wherein a first signal output end of the MCU subunit is electrically connected to the PFC driving subunit, and the MCU subunit is configured to send a first control signal to the PFC driving subunit; the PFC driving subunit is electrically connected to a control end of the PFC subunit, and the PFC driving subunit is configured to control operation of the PFC subunit based on the first control signal; and wherein a second signal output end of the MCU subunit is electrically connected to the IPM driving subunit, and the MCU subunit is configured to send a second control signal to the IPM driving subunit; the IPM driving subunit is electrically connected to a control end of the inverter subunit, and the IPM driving subunit is configured to control operation of the inverter subunit based on the second control signal.

6. The controller according to claim 4, wherein the low-voltage control unit comprises an MCU subunit and an IPM driving subunit and a PFC driving subunit, and the high-voltage operating unit comprises a PFC subunit and an inverter subunit; a first input end of the PFC subunit is electrically connected to a first output end of the first rectifier unit, and a second input end of the PFC subunit is electrically connected to a second output end of the first rectifier unit; wherein a first signal output end of the MCU subunit is electrically connected to the PFC driving subunit, and the MCU subunit is configured to send a first control signal to the PFC driving subunit; the PFC driving subunit is electrically connected to a control end of the PFC subunit, and the PFC driving subunit is configured to control operation of the PFC subunit based on the first control signal; and wherein a second signal output end of the MCU subunit is electrically connected to the IPM driving subunit, and the MCU subunit is configured to send a second control signal to the IPM driving subunit; the IPM driving subunit is electrically connected to a control end of the inverter subunit, and the IPM driving subunit is configured to control operation of the inverter subunit based on the second control signal.

7. The controller according to claim 2, further comprising a second rectifier unit, wherein the low-voltage control unit comprises an MCU subunit and an IPM driving subunit and a PFC driving subunit, and the high-voltage operating unit comprises a PFC subunit and an inverter subunit; an input end of the PFC subunit is electrically connected to an output end of the second rectifier unit, and an output end of the PFC subunit is electrically connected to an input end of the inverter subunit;

wherein a first signal output end of the MCU subunit is electrically connected to the PFC driving subunit, and the MCU subunit is configured to send a first control signal to the PFC driving subunit; the PFC driving subunit is electrically connected to a control end of the PFC subunit, and the PFC driving subunit is configured to control operation of the PFC subunit based on the first control signal; and wherein a second signal output end of the MCU subunit is electrically connected to the IPM driving subunit, and the MCU subunit is configured to send a second control signal to the IPM driving subunit; the IPM driving subunit is electrically connected to a control end of the inverter subunit, and the IPM driving subunit is configured to control operation of the inverter subunit based on the second control signal.

8. The controller according to claim 4, further comprising a second rectifier unit, wherein the low-voltage control unit comprises an MCU subunit and an IPM driving subunit and a PFC driving subunit, and the high-voltage operating unit comprises a PFC subunit and an inverter subunit; an input end of the PFC subunit is electrically connected to an output end of the second rectifier unit, and an output end of the PFC subunit is electrically connected to an input end of the inverter subunit;

wherein a first signal output end of the MCU subunit is electrically connected to the PFC driving subunit, and the MCU subunit is configured to send a first control signal to the PFC driving subunit; the PFC driving subunit is electrically connected to a control end of the PFC subunit, and the PFC driving subunit is configured to control operation of the PFC subunit based on the first control signal; and wherein a second signal output end of the MCU subunit is electrically connected to the IPM driving subunit, and the MCU subunit is configured to send a second control signal to the IPM driving subunit; the IPM driving subunit is electrically connected to a control end of the inverter subunit, and the IPM driving subunit is configured to control operation of the inverter subunit based on the second control signal.

9. The controller according to claim 1, wherein the HPS wiring terminal is connected between the output end of the power conversion unit and the power supply end of the low-voltage control unit.

10. The controller according to claim 1, wherein the power conversion unit comprises a flyback conversion circuit.

11. The controller according to claim 10, further comprising a DC/DC conversion unit, wherein an output end of the flyback conversion circuit is electrically connected to an input end of the DC/DC conversion unit, and an output end of the DC/DC conversion unit is electrically connected to the power supply end of the low-voltage control unit.

12. The controller according to claim 11, wherein the HPS wiring terminal is connected between the output end of the flyback conversion circuit and the input end of the DC/DC conversion unit, or the HPS wiring terminal is connected between the output end of the DC/DC conversion unit and the power supply end of the low-voltage control unit.

13. The controller according to claim 3, wherein the PFC subunit comprises a boost circuit.

14. An air conditioner, comprising a compressor, a condenser, a throttling apparatus, and an evaporator, further comprising the controller according to claim 1, wherein the high-voltage operating unit of the controller is electrically connected to the compressor to control the compressor; and the pressure switch is provided on a refrigerant pipe between the compressor and the condenser, or arranged at an outlet of the compressor.

15. A high-pressure protection circuit, comprising a first rectifier unit, a power conversion unit, a pressure switch, a low-voltage control unit, and a high-voltage operating unit;

wherein an input end of the first rectifier unit is capable of being electrically connected to an input power supply, an output end of the first rectifier unit is electrically connected to an input end of the power conversion unit, and the first rectifier unit is configured to convert an input AC into a high-voltage DC and output the high-voltage DC to the power conversion unit;

wherein an output end of the power conversion unit is electrically connected to a power supply end of the low-voltage control unit, and the power conversion unit is configured to convert the high-voltage DC into a low-voltage DC and output the low-voltage DC to the power supply end of the low-voltage control unit to supply power to the low-voltage control unit;

wherein the pressure switch is connected to a front end of the power supply end of the low-voltage control unit to be capable of switching off or switching on a power supply voltage of the low-voltage control unit; and wherein an output end of the low-voltage control unit is connected to a control end of the high-voltage operating unit, and the low-voltage control unit is configured to output a control signal to control operation of the high-voltage operating unit.

16. The high-pressure protection circuit according to claim 15, wherein a first end of an input side of the first rectifier unit is electrically connected to a first end of the pressure switch, and a second end of the pressure switch is capable of being electrically connected to a first end of the input power supply; a second end of the input side of the first rectifier unit is electrically connected to a second end of the input power supply; the output end of the first rectifier unit is electrically connected to the input end of the power conversion unit, and the first rectifier unit is configured to convert an AC into a high-voltage DC and output the high-voltage DC to the power conversion unit; the output end of the power conversion unit is electrically connected to the power supply end of the low-voltage control unit, and the power conversion unit is configured to convert the high-voltage DC into a low-voltage DC and output the low-voltage DC to the power supply end of the low-voltage control unit to supply power to the low-voltage control unit; the output end of the low-voltage control unit is connected to the control end of the high-voltage operating unit, and the low-voltage control unit is configured to output a control signal to control operation of the high-voltage operating unit.

17. The high-pressure protection circuit according to claim 15, wherein the pressure switch is connected between the output end of the first rectifier unit and the input end of the power conversion unit, or the pressure switch is connected between the output end of the power conversion unit and the power supply end of the low-voltage control unit.

18. The high-pressure protection circuit according to claim 15, wherein the low-voltage control unit comprises an MCU subunit and an IPM driving subunit and a PFC driving subunit, and the high-voltage operating unit comprises a PFC subunit and an inverter subunit; an input end of the PFC subunit is electrically connected to the output end of the first rectifier unit, and an output end of the PFC subunit is electrically connected to an input end of the inverter subunit;

wherein a first signal output end of the MCU subunit is electrically connected to the PFC driving subunit, and the MCU subunit is configured to send a first control signal to the PFC driving subunit; the PFC driving subunit is electrically connected to a control end of the PFC subunit, and the PFC driving subunit is configured to control operation of the PFC subunit based on the first control signal; and wherein a second signal output end of the MCU subunit is electrically connected to the IPM driving subunit, and the MCU subunit is configured to send a second control signal to the IPM driving subunit; the IPM driving subunit is electrically connected to a control end of the inverter subunit, and the IPM driving subunit is configured to control operation of the inverter subunit based on the second control signal.

19. The high-pressure protection circuit according to claim 17, further comprising a second rectifier unit, wherein the low-voltage control unit comprises an MCU subunit and an IPM driving subunit and a PFC driving subunit, and the high-voltage operating unit comprises a PFC subunit and an inverter subunit; an input end of the PFC subunit is electrically connected to an output end of the second rectifier unit, and an output end of the PFC subunit is electrically connected to an input end of the inverter subunit;

wherein a first signal output end of the MCU subunit is electrically connected to the PFC driving subunit, and the MCU subunit is configured to send a first control signal to the PFC driving subunit; the PFC driving subunit is electrically connected to a control end of the PFC subunit, and the PFC driving subunit is configured to control operation of the PFC subunit based on the first control signal; and wherein a second signal output end of the MCU subunit being electrically connected to the IPM driving subunit, and the MCU subunit is configured to send a second control signal to the IPM driving subunit; the IPM driving subunit is electrically connected to a control end of the inverter subunit, and the IPM driving subunit is configured to control operation of the inverter subunit based on the second control signal.

20. The high-pressure protection circuit according to claim 15, wherein the power conversion unit comprises a flyback conversion unit; the high-pressure protection circuit further comprises a DC/DC conversion unit, an output end of the flyback conversion unit is electrically connected to an input end of the DC/DC conversion unit, and an output end of the DC/DC conversion unit is electrically connected to a power supply input end of the low-voltage control unit; the pressure switch is connected between the output end of the first rectifier unit and an input end of the flyback conversion unit, or the pressure switch is connected between the output end of the flyback conversion unit and the input end of the DC/DC conversion unit, or the pressure switch is connected between the output end of the DC/DC conversion unit and the power supply input end of the low-voltage control unit.

* * * * *